United States Patent
Ryu et al.

(10) Patent No.: US 9,406,922 B2
(45) Date of Patent: Aug. 2, 2016

(54) SECONDARY BATTERY INCLUDING INTEGRATED ANODE AND CATHODE LEADS AND METHOD OF MANUFACTURING THE SAME

(71) Applicant: LG CHEM, LTD., Seoul (KR)

(72) Inventors: Sang-Baek Ryu, Daejeon (KR); Dong-Myung Kim, Daejeon (KR); Ki-Woong Kim, Daejeon (KR); Hyang-Mok Lee, Daejeon (KR)

(73) Assignee: LG CHEM, LTD, Seoul (KR)

( * ) Notice: Subject to any disclaimer, the term of this patent is extended or adjusted under 35 U.S.C. 154(b) by 185 days.

(21) Appl. No.: 14/186,061

(22) Filed: Feb. 21, 2014

(65) Prior Publication Data

US 2014/0199581 A1    Jul. 17, 2014

Related U.S. Application Data

(63) Continuation of application No. PCT/KR2013/011075, filed on Dec. 2, 2013.

(30) Foreign Application Priority Data

Jan. 11, 2013  (KR) .................. 10-2013-0003456
Nov. 29, 2013 (KR) .................. 10-2013-0147809

(51) Int. Cl.
*H01M 2/26* (2006.01)
*H01M 10/052* (2010.01)

(52) U.S. Cl.
CPC ............ *H01M 2/266* (2013.01); *H01M 10/052* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 2003/0054241 A1 | 3/2003 | Yamashita et al. | |
| 2003/0148174 A1* | 8/2003 | Gu ........................ | H01M 2/145 429/129 |
| 2006/0238162 A1 | 10/2006 | Cheon et al. | |
| 2007/0231701 A1* | 10/2007 | Lee ......................... | H01M 2/18 429/246 |
| 2008/0124614 A1 | 5/2008 | Cheon et al. | |
| 2008/0213659 A1 | 9/2008 | Yamada | |
| 2008/0241680 A1* | 10/2008 | Lee ......................... | H01M 2/021 429/185 |

(Continued)

FOREIGN PATENT DOCUMENTS

| | | |
|---|---|---|
| CN | 1855600 A | 11/2006 |
| CN | 101241976 A | 8/2008 |

(Continued)

OTHER PUBLICATIONS

Extended European Search Report for European Application No. 13871151.0, dated Aug. 24, 2015.

(Continued)

*Primary Examiner* — Patrick Ryan
*Assistant Examiner* — Wyatt McConnell
(74) *Attorney, Agent, or Firm* — Birch, Stewart, Kolasch & Birch, LLP (57) ABSTRACT

Provided is a secondary battery including integrated anode and cathode leads and a method of manufacturing the same. An anode lead and a cathode lead of a secondary battery aligned to be parallel with respect to each other are encompassed by a single lead film. Thus, sealing may be easily implemented, lead film components may be managed as one component, and vibrations of an electrode lead may be prevented.

14 Claims, 2 Drawing Sheets

(56) References Cited

U.S. PATENT DOCUMENTS

| | | | |
|---|---|---|---|
| 2009/0023062 A1* | 1/2009 | Kim | H01M 2/021 429/163 |
| 2010/0035144 A1* | 2/2010 | Oh | H01M 2/021 429/164 |
| 2011/0064991 A1* | 3/2011 | Ahn | H01M 10/0436 429/153 |
| 2012/0208077 A1 | 8/2012 | Hohenthanner et al. | |
| 2012/0321930 A1* | 12/2012 | Ahn | H01M 2/06 429/144 |
| 2013/0040192 A1 | 2/2013 | Kim | |
| 2013/0045402 A1 | 2/2013 | Takahashi | |

FOREIGN PATENT DOCUMENTS

| | | |
|---|---|---|
| CN | 102859758 A | 1/2013 |
| JP | 11-233133 A | 8/1999 |
| JP | 2000-353504 A | 12/2000 |
| JP | 2002-151020 A | 5/2002 |
| JP | 2003-86153 A | 3/2003 |
| JP | 2003-168403 A | 6/2003 |
| JP | 2003-257387 A | 9/2003 |
| JP | 2005-26181 A | 1/2005 |
| JP | 2005-116235 A | 4/2005 |
| JP | 2006-252802 A | 9/2006 |
| JP | 2006-310308 A | 11/2006 |
| JP | 2008-192451 A | 8/2008 |
| JP | 2008-235256 A | 10/2008 |
| JP | 2008-277238 A | 11/2008 |
| JP | 2009-26739 A | 2/2009 |
| JP | 2012-48852 A | 3/2012 |
| JP | 2013-502676 A | 1/2013 |
| KR | 2002-0080455 A | 10/2002 |
| KR | 10-2006-0112035 A | 10/2006 |
| KR | 10-2010-0093986 A | 8/2010 |
| KR | 10-2012-0136718 A | 12/2012 |
| WO | WO 2011/020595 A1 | 2/2011 |
| WO | WO 2011/136090 A1 | 11/2011 |

OTHER PUBLICATIONS

VARTA Microbattery GmbH, "LPP 402025 CE Rechargeable Lithium-Ion Pouch Data Sheet—Prior to use read Handling Precaution and Prohibitions for VARTA Li-ion Batteries," RH690377, Mar. 8, 2011, 1 page, XP055206761.

\* cited by examiner fig. 1 fig. 2 fig. 3 fig. 4

SECONDARY BATTERY INCLUDING INTEGRATED ANODE AND CATHODE LEADS AND METHOD OF MANUFACTURING THE SAME

CROSS-REFERENCE TO RELATED APPLICATIONS

This application is a Continuation Bypass Application of International Patent Application No. PCT/KR2013/011075, filed Dec. 2, 2013, and claims the benefit of Korean Patent Application Nos. 10-2013-0003456 filed on Jan. 11, 2013, and 10-2013-0147809 filed on Nov. 29, 2013, in the Korean Intellectual Property Office, the disclosure of which are incorporated herein by reference.

BACKGROUND OF THE INVENTION

1. Field of the Invention

The present disclosure relates to a secondary battery including integrated anode and cathode leads formed by allowing an anode lead and a cathode lead to be encompassed by a single lead film, and a method of manufacturing the same.

2. Description of the Related Art

In general, in accordance with the miniaturization and lightening of portable wireless devices such as video cameras, mobile phones, portable computers, digital cameras, and the like, the development of electric vehicles and high performance electric vehicles, with respect to secondary batteries used as driving power supplies, the development of small sized, lightweight secondary batteries having excellence in terms of energy density and charging and discharging characteristics have been in demand.

As such secondary batteries, for example, nickel-cadmium batteries, nickel-hydrogen batteries, nickel-zinc batteries, lithium secondary batteries, and the like may be used. For example, lithium secondary batteries have positive attributes such as relatively long lifespans and high energy density. In addition, according to a type of electrolyte, lithium secondary batteries may be classified as lithium metal batteries and lithium ion batteries using a liquid electrolyte and lithium polymer batteries using a high molecular solid electrolyte.

Figure 1:
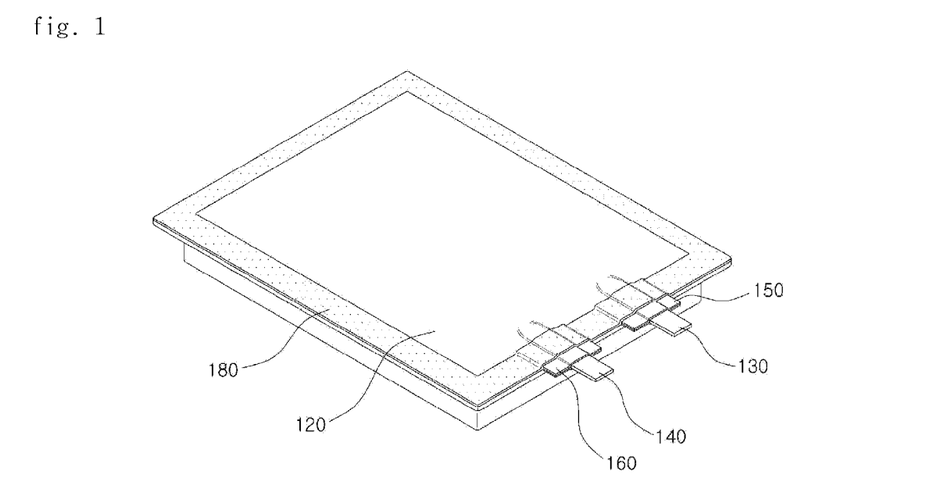
FIG. 1 is a perspective view of a general lithium secondary battery.

FIG. 1 is a perspective view of a general lithium secondary battery. With reference to FIG. 1, a lithium secondary battery includes an electrode assembly containing an anode and a cathode (not shown), an exterior pouch material 120 formed to encompass an edge surface of the electrode assembly to be sealed and containing an electrolytic liquid filling the interior, and an anode lead 130 and a cathode lead 140 respectively welded to the anode and the cathode of the electrode assembly and aligned to be parallel with respect to each other.

In this case, the anode lead 130 is formed by coating aluminum foil with a lithium composite oxide, allowing for the charging and discharging of lithium ions, and the cathode lead 140 is formed by coating nickel foil with a carbon material allowing for the absorption, attachment and detachment of lithium ions. In order to increase insulation properties and improve sealing strength at the time of sealing the exterior pouch material, lead films 150 and 160 may be attached to two electrode leads 130 and 140, respectively.

The lead films 150 and 160 are attached to both surfaces of the anode and cathode leads 130 and 140 to allow the anode and cathode leads 130 and 140 to be exposed externally for a predetermined distance, respectively, to be interposed between outer edges of an upper pouch 120 and a lower pouch 120. In this case, the exterior pouch material 120 is subjected to a heat fusion process performed along an edge of the exterior pouch material as well as a portion having the lead films 150 and 160 interposed between the outer edges, thus forming a sealing portion 180. Accordingly, in the case of the secondary battery, a gap between the outer edges of the exterior pouch material 120 may be sealed to prevent leakage of electrolyte filling the inside of the exterior pouch material 120.

On the other hand, a method of attaching the lead films 150 and 160 to both surfaces of the anode and cathode leads 130 and 140, respectively, may be performed by applying heat in a state in which two lead films are generally located on upper and lower surfaces of the anode and cathode leads to be subjected to heat fusion to attach the lead films to the upper and lower surfaces of the anode and cathode leads. In this case, when the anode and cathode leads are respectively sealed, problems in which sealing is difficult to perform in a case in which a gap between two leads is reduced and a secondary battery is unstable due to lead vibrations may occur.

Furthermore, when general lithium secondary batteries are in an abnormal operating state such as when internal short circuits occur, overcharging and high temperature exposure, and the like, during operating, high-pressure gases may be generated while internal electrolytes are decomposed. The generated high-pressure gases may transform battery cases and may shorten lifespans of batteries, and a serious problem such as ignition or explosion of batteries may occur. Thus, security problems may occur.

SUMMARY OF THE INVENTION

An aspect of the present disclosure may provide a secondary battery capable of preventing the occurrence of a problem in which sealing is difficult to be implemented in a case in which an anode lead and a cathode lead are sealed by lead films respectively, and thus, a gap between two leads is relatively reduced, and capable of enabling an anode lead and a cathode lead to be firmly fixed without vibrations to be managed as a single component, and a method of manufacturing the same.

In addition, an aspect of the present disclosure may provide a secondary battery having enhanced operational stability and reliability by allowing for effective discharge of high pressure gas inside a battery cell toward a necessary portion to prevent indiscriminate discharging of noxious gas, and a method of manufacturing the same.

According to an aspect of the present disclosure, a secondary battery may include: one or more anodes having an anode tab attached thereto; one or more cathodes having a cathode tab attached thereto; an electrode assembly formed by stacking the one or more anodes and the one or more cathodes on each other to have a separation film interposed therebetween; a pouch receiving the electrode assembly and having an upper portion and a lower portion; an anode tab bonding part electrically connected to overlapped portions of the anode tabs stacked on each other; a cathode tab bonding part electrically connected to overlapped portions of the cathode tabs stacked on each other; an anode lead connected to the anode tab bonding part; a cathode lead connected to the cathode tab bonding part; a lead film encompassing the anode lead and the cathode lead to have a form in which portions of the anode lead and the cathode lead are exposed externally; and a sealing portion formed by allowing an upper pouch and a lower pouch to be subjected to a heat fusion process in a state in which the lead film is interposed between outer edges of the upper pouch and the lower pouch, to then be formed on an outer edge of the pouch, wherein the anode lead and the cathode lead are aligned to be parallel with respect to each other and are encompassed by a single lead film.

A distance between the anode lead and the cathode lead may range from 4 to 14 mm.

The lead film may include one or more cut portions having a structure recessed inwardly from the exterior, between the anode lead and the cathode lead.

The cut portion may have at least one or more selected from a group including an inverted triangular shape, a semicircular shape, a quadrangular shape, and a trapezoidal shape.

A portion of the sealing portion in which the cut portion is formed may have a width smaller than that of a different portion of the sealing portion except for the portion in which the cut portion is formed.

A material of the lead film may be polypropylene or polyethylene.

A thickness of the lead film may range from 0.05 to 0.15 mm.

The secondary battery may be a lithium ion secondary battery or a lithium ion polymer secondary battery.

According to an aspect of the present disclosure, a method of manufacturing a secondary battery may include: preparing an electrode assembly formed by stacking one or more anodes having an anode tab attached thereto and one or more cathodes having a cathode tab attached thereto in a state in which a separation film is interposed between the anode and the cathode, the electrode assembly including an anode lead connected to an anode tab bonding part electrically connected to overlapped portions of the anode tabs stacked on each other and a cathode lead connected to a cathode tab bonding part electrically connected to overlapped portions of the cathode tabs stacked on each other, the anode lead and the cathode lead being aligned to be parallel with respect to each other; providing the anode lead and the cathode lead to be encompassed by a single lead film to have a form in which portions of the anode lead and the cathode lead are exposed externally; receiving the electrode assembly in an internal space between an upper pouch and a lower pouch; and forming a sealing portion by performing a heat fusion process on an outer edge of the pouch in a state in which the lead film is interposed between outer edges of the upper pouch and the lower pouch.

The lead film may include one or more cut portions having a structure recessed inwardly from the exterior, between the anode lead and the cathode lead.

The cut portion may have at least one or more selected from a group including an inverted triangular shape, a semicircular shape, a quadrangular shape, and a trapezoidal shape.

The lead film interposed between the outer edges of the upper pouch and the lower pouch may include one or more cut portions.

In the forming of the sealing portion, a heat fusion process may be performed except for a portion of an outer edge of the pouch overlapped with the cut portion.

The cut portion may be formed by cutting, inwardly from the exterior, a portion of the lead film encompassed by the sealing portion, subsequently to the forming of the sealing portion.

A portion of the sealing portion in which the cut portion is formed may have a width smaller than that of a different portion of the sealing portion except for the portion in which the cut portion is formed.

BRIEF DESCRIPTION OF THE DRAWINGS

The above and other aspects, features and other advantages of the present disclosure will be more clearly understood from the following detailed description taken in conjunction with the accompanying drawings, in which.

Wherein in the drawings, 120 refers to a pouch, 130 refers to an anode lead, 140 refers to a cathode lead, 150 and 160 refer to lead films which are attached to an anode lead and a cathode lead, respectively, according to the related art. And 170 refers to a lead film according to the present disclosure. 170-*a* refers to a region of a pouch in which a lead film is interposed between outer edges of an upper pouch and a lower pouch, 180 refers to a sealing portion, 300 refers to a cut portion, Wa refers to a width of a sealing portion in which a cut portion is not formed, and Wb refers to a width of a sealing portion in which a cut portion is formed.

DETAILED DESCRIPTION OF THE PREFERRED EMBODIMENT

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In order to prevent the occurrence of a problem in which sealing may not be easily implemented when a gap between two leads is reduced at the time of sealing an anode lead and a cathode lead using separate lead films, according to an exemplary embodiment of the present disclosure, a secondary battery in which an anode lead and a cathode lead are formed to be encompassed by a single lead film to be firmly fixed without occurrence of vibrations and are managed as a single component, and a method of manufacturing the same, may be provided.

A secondary battery including integrated anode and cathode leads according to an exemplary embodiment of the present disclosure may include one or more anodes having an anode tab attached thereto, one or more cathodes having a cathode tab attached thereto; an electrode assembly formed by stacking the anode and the cathode on each other to have a separation film interposed between the anode and the cathode; a pouch receiving the electrode assembly and having an upper portion and a lower portion; an anode tab bonding part electrically connected to overlapped portions of the anode tabs stacked on each other; a cathode tab bonding part electrically connected to a portion in which the cathode tabs are stacked on each other; an anode lead connected to the anode tab bonding part; a cathode lead connected to the cathode tab bonding part; a lead film encompassing the anode lead and the cathode lead to have a form in which portions of the anode lead and the cathode lead are exposed externally and a sealing portion formed by allowing an upper pouch and a lower pouch to be subjected to heat fusion in a state in which the lead film is interposed between outer edges of the upper pouch and the lower pouch, to then be formed on an outer edge of the pouch. The anode lead and the cathode lead may be aligned to be parallel with respect to each other and may be formed to be encompassed by a single lead film.

First, the electrode assembly included in the secondary battery according to the embodiment of the present disclosure may have a structure in which one or more anodes and one or more cathodes are stacked to have a separation film between the anode and the cathode, for example, a structure of an anode/a separation film/a cathode. The anode tab and the cathode tab may be attached to the stacked anodes and the stacked cathodes, respectively. In addition, the anode tab bonding part may be electrically connected to overlapped portions of the anode tabs stacked on each other, and the cathode tab bonding part may be electrically connected to overlapped portions of the cathode tabs stacked on each other. The anode lead may be connected to the anode tab bonding part, and the cathode lead may be connected to the cathode tab bonding part.

However, according to the exemplary embodiment of the present disclosure, the electrode assembly may be formed by stacking electrode plates having the same polarity to allow positions of electrode plate tabs to coincide with each other in an axial direction of the electrode plate. Therefore, the anode lead and the cathode lead may be aligned to be parallel with respect to each other to facilitate welding of the stacked anode tabs and the stacked cathode tabs to the anode lead and the cathode lead, respectively.

In addition, although a distance between the anode lead and the cathode lead is not particularly limited, when the distance is less than 4 mm, as an amount of a current flowing in the lead is increased, a heat occurrence rate may be increased to deteriorate stability. In detail, in the case of a battery having a relatively large area requiring high energy properties in which an electrode assembly is manufactured to have an area of 225 $cm^2$ or more, in order to charge and discharge high energy, battery reliability may be further deteriorated. In addition, when the distance between the anode lead and the cathode lead exceeds 14 mm, inconvenience in the management may be caused. Therefore, the distance between the anode lead and the cathode lead may be 4 to 14 mm.

Figure 2:
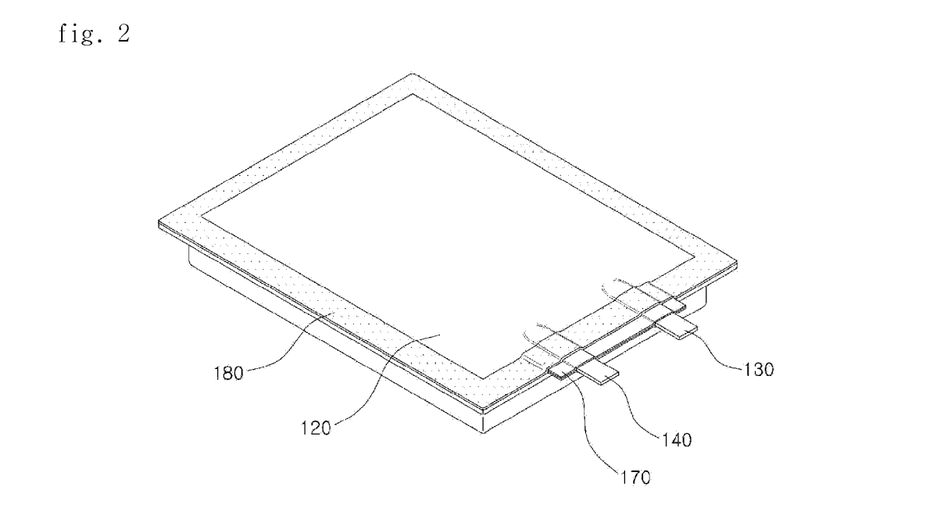
FIG. 2 is a perspective view of a secondary battery according to an exemplary embodiment of the present disclosure.

FIG. 2 is a perspective view of a secondary battery according to an exemplary embodiment of the present disclosure. The anode lead 130 and the cathode lead 140 may be aligned to be parallel with respect to each other. Portions of two leads may be formed to be encompassed by a single lead film 170, and remaining portions of the two leads may be exposed externally at one end of the pouch by a predetermined length. In this case, the lead film 170 may be interposed between outer edges of the upper pouch and the lower pouch to be subjected to a heat fusion process as well as the edge surfaces of the pouch to thus form the sealing portion 180.

According to the embodiment of the present disclosure as described above, as the two electrode leads are both encompassed by the single lead film 170, the anode and cathode leads may be managed as one component. Further, a phenomenon in which the leads vibrate may be prevented. In addition, the formation of sealing may be facilitated even when a distance between two leads is relatively reduced.

In addition, although a lead film type according to an exemplary embodiment of the present disclosure is not particularly limited, as a material of the lead film, polypropylene or polyethylene may be used to have insulation properties. When a thickness of the lead film is less than 0.05 mm, insulation properties may be deteriorated. Thus, in this case, when the battery is used, a defect such as a leakage of current may cause danger. Further, when thickness of the lead film exceeds 0.15 mm, sealing of the lead film, suitable therefor, may not be realized, due to the occurrence of a gap, and thus electrolyte may leak. Therefore, the thickness of the lead film may range from 0.05 to 0.15 mm.

In addition, the lead film included in the secondary battery according to an exemplary embodiment of the present disclosure may include one or more cut portions having a structure recessed inwardly from the exterior, between the anode lead and the cathode lead. Although the sealing portion may be continuously formed to extend along an outer edge of the pouch, the sealing portion may not be formed in a portion of an outer edge surface of the pouch overlapped with the cut portion.

In detail, a portion of an outer edge surface of the pouch overlapped with the cut portion present in the lead film may not be sealed, and in this case, the upper pouch and the lower pouch may be respectively provided in an open state. Alternatively, exterior material of the pouch overlapped with the cut portion may also be removed to have the same form as that of the cut portion so as not to form a sealing portion.

Thus, as described above according to the present disclosure, since the sealing portion may not be formed in the portion of the pouch outer surface overlapped with the cut portion formed in the lead film, a portion of the sealing portion in which the cut portion is formed may have a width smaller than that of a different portion of the sealing portion except for the portion in which the cut portion is formed.

Conversely, when the secondary battery is in an abnormal operating state, an internal electrolyte may be decomposed to generate high pressure gas. According to the present disclosure, the lead film may include a cut portion, and a portion of the sealing portion in which the cut portion is formed may have a width smaller than that of a portion of the sealing portion except for the portion in which the cut portion is formed. Thus, expansion and stress may be concentrated in the portion of the sealing portion having a relatively small width in which the cut portion is formed, to induce the portion to initially open. Therefore, gas may be discharged to the exterior through the cut portion to improve battery stability and reliability in operating the manufactured battery.

However, although a width of the portion of the sealing portion in which the cut portion is formed may be smaller than that of a different portion of the sealing portion, when a difference in the widths is relatively too small, an effect of inducing gas to be discharged on a gas discharge path is relatively weak. Thus, when high pressure gas is generated inside a battery cell, an effect of initially opening in a region in which the cut portion is formed may not be exhibited. When a difference in the widths is relatively too great, battery sealing properties may not be secured. The width of the sealing portion in which the cut portion is formed may have the size of 40 to 80%, based on the width of a different portion of the sealing portion.

In addition, the amount of the cut portions is not particularly limited, and may be appropriately adjusted in consideration of a distance between the anode and cathode leads, predicted gas pressure, and process efficiency in a formation process. Considering general requirements as described above, one or two cut portions may be formed.

In addition, the cut portion may have various shapes, for example, at least one or more selected from a group including an inverted triangular shape, a semicircular shape, a quadrangular shape, and a trapezoidal shape. In detail, the shape of the cut portion may be an inverted triangular shape to facilitate formation of the cut portion or may be a rectangular shape to obtain an effect of effectively inducing gas discharge.

Figure 3:
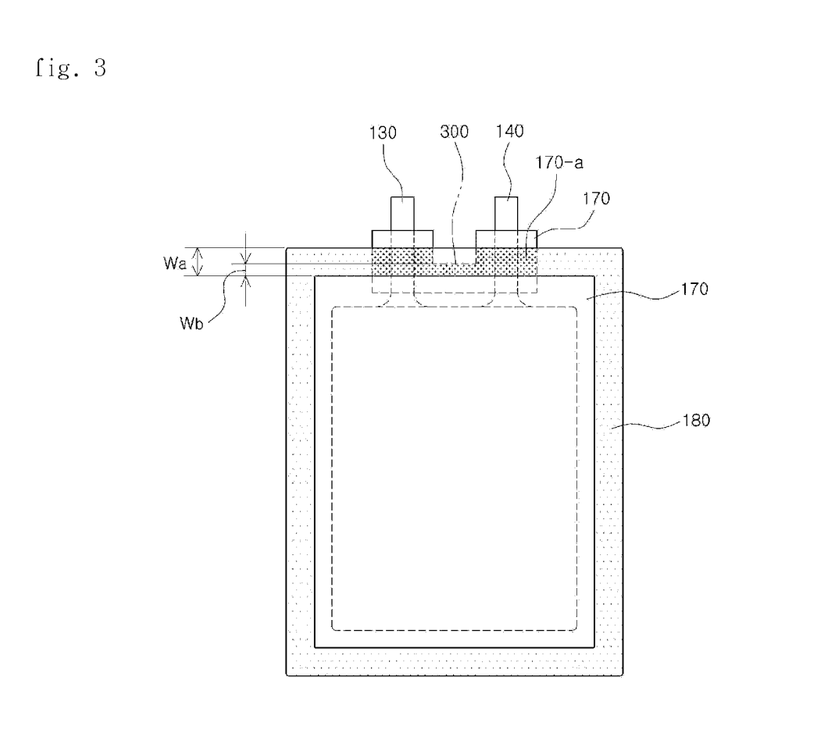
FIG. 3 is a perspective cross-sectional view of a secondary battery according to an exemplary embodiment of the present disclosure.

FIG. 3 is a perspective cross-sectional view of a secondary battery including a lead film having a cut portion formed therein according to an exemplary embodiment of the present disclosure. The anode lead 130 and the cathode lead 140 may be aligned to be parallel with respect to each other, and portions of the two electrode leads 130 and 140 may be formed to be encompassed by a single lead film 170. Here, the lead film 170 may be interposed between outer edges of an upper pouch and a lower pouch to then be subjected to a heat fusion process performed along an edge of the pouch 120 as well as a region 170-a of the pouch in which the lead film 170 is interposed between the pouches 120 to thus form a sealing portion 180.

However, in the lead film 170, a rectangular cut portion 300 may be formed between the anode lead 130 and the cathode lead 140. A portion of the pouch 120 overlapped with a portion of the lead film 170 in which the cut portion 300 is formed may not be subjected to heat fusion, to be in a state in which the upper pouch and the lower pouch are separated from each other.

Thus, since the sealing portion 180 is not formed in a portion of the lead film in which the cut portion 300 is formed, the sealing portion, disposed in a region in which the cut portion is formed may have a width Wb, smaller than a width Wa of a different portion of the sealing portion. Thus, when gas is generated inside the secondary battery, expansion and stress may be concentrated in a portion in which the cut portion 300 is formed, to induce the portion in which the cut portion is formed to open first.

Figure 4:
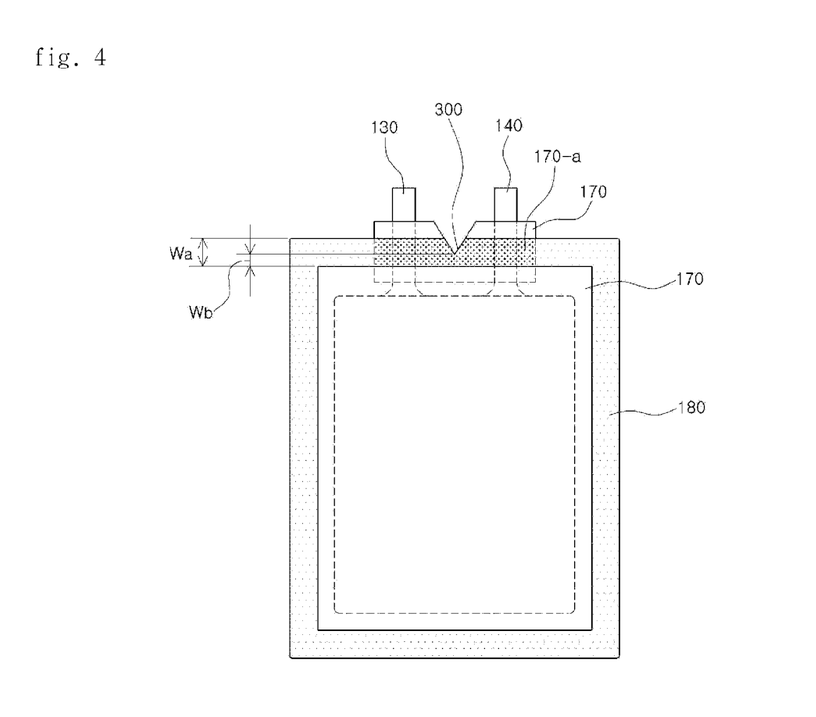
FIG. 4 is a perspective cross-sectional view of a secondary battery according to an exemplary embodiment of the present disclosure.

FIG. 4 is a perspective cross-sectional view of a secondary battery having a cut portion formed therein according to an exemplary embodiment of the present disclosure. An anode lead 130 and a cathode lead 140 may be aligned to be parallel with respect to each other, and portions of the two electrode leads 130 and 140 may be formed to be encompassed by a single lead film 170. Here, the lead film 170 may be interposed between outer edges of an upper pouch and a lower pouch to then be subjected to a heat fusion process performed along an outer edge of the pouch 120 as well as a region 170-a of the pouch in which the lead film 170 is interposed between the pouches 120 to thus form a sealing portion 180.

However, the lead film 170, as described above, may have a cut portion 300 having an inverted triangular shape formed between the anode lead 130 and the cathode lead 140. In the case of a region corresponding to the portion of the lead film in which the cut portion 300 is formed, a portion of the pouch 120 may be removed to have the same form as the inverted triangular shape of the cut portion so as for exterior material of the pouch 120 as well as the sealing portion 180 to be absent.

Therefore, since the sealing portion, disposed in a region in which the cut portion is formed has a width Wb smaller than a width Wa of a different portion of the sealing portion, when gas is generated inside the secondary battery, expansion and stress may be concentrated in a portion in which the cut portion 300 is formed, to induce the portion in which the cut portion is formed to open first.

Although a secondary battery type according to an exemplary embodiment of the present disclosure is not particularly limited, a lithium ion secondary battery using a liquid electrolyte or a lithium ion polymer battery using a high molecular solid electrolyte may be used depending on an electrolyte type.

A method of manufacturing a secondary battery including integrated anode and cathode leads according to an exemplary embodiment of the present disclosure is described. A method of manufacturing a secondary battery including integrated anode and cathode leads according to an exemplary embodiment may include preparing an electrode assembly formed by stacking one or more anodes having an anode tab attached thereto and one or more cathodes having a cathode tab attached thereto in a state in which a separation film is interposed between the anode and the cathode, the electrode assembly including an anode lead connected to an anode tab bonding part electrically connected to overlapped portions of the anode tabs stacked on each other and a cathode lead connected to a cathode tab bonding part electrically connected to overlapped portions of the cathode tabs stacked on each other, the anode lead and the cathode lead being aligned to be parallel with respect to each other; providing the anode lead and the cathode lead to be encompassed by a single lead film to have a form in which portions of the anode lead and the cathode lead are exposed externally; receiving the electrode assembly in an internal space between an upper pouch and a lower pouch; and forming a sealing portion by performing a heat fusion process on an outer edge of the pouch in a state in which the lead film is interposed between outer edges of the upper pouch and the lower pouch.

First, the electrode assembly according to the embodiment of the present disclosure may have a structure in which one or more anodes and one or more cathodes are stacked to have a separation film between the anode and the cathode, for example, a structure of an anode/a separation film/a cathode. The anode tab and the cathode tab may be attached to the stacked anodes and the stacked cathodes, respectively. In addition, the anode tab bonding part may be electrically connected to the overlapped portion between the anode tabs stacked on each other, and the cathode tab bonding part may be electrically connected to the overlapped portion between the cathode tabs stacked on each other. Further, the anode lead may be coupled to the anode tab bonding part, and the cathode lead may be coupled to the cathode tab bonding part, using a method such as a welding method or the like, to be exposed externally from the pouch.

However, according to the exemplary embodiment of the present disclosure, electrode plates having the same polarity may be stacked on each other to allow positions of electrode plate tabs to coincide with each other in an axial direction of the electrode plate. The anode lead and the cathode lead may be respectively connected to the electrode plate tabs, to be aligned to be parallel with respect to each other, to facilitate welding of the anode lead and the cathode lead to the stacked tabs.

In addition, although a distance between the anode lead and the cathode lead aligned to be parallel in the electrode assembly is not particularly limited, when the distance is less than 4 mm, as an amount of a current flowing in the lead is increased, a heat occurrence rate may be increased to deteriorate stability. In detail, in the case of a battery having a relatively large area requiring high energy properties in which an electrode assembly is manufactured to have an area of 225 $cm^2$ or more, in order to charge and discharge high energy, battery reliability may be further deteriorated. In addition, when the distance between the anode lead and the cathode lead exceeds 14 mm, inconvenience in terms of management may occur. Therefore, the distance between the anode lead and the cathode lead may be 4 to 14 mm.

When the electrode assembly as above is prepared, the lead film may be attached to the anode lead and the cathode lead electrically connected to electrodes terminals of the electrode assembly in order to increase sealing strength and improve insulating properties. In the exemplary embodiment of the present disclosure, the anode lead and the cathode lead may be both encompassed by one sheet of lead film to allow portions of areas of the anode lead and the cathode lead to be exposed externally. Thus, even when a distance between the leads is relatively reduced, sealing properties may be easily obtained and vibrations of electrode leads may be prevented to be able to manage a secondary battery as a single component.

As described above, when the lead film is attached to portions of the anode and cathode leads, the electrode assembly may be interposed between the upper pouch and the lower pouch configured of an aluminum laminate sheet, for example, may be received in an internal space between the upper pouch and the lower pouch.

However, the present disclosure is not limited to receiving the electrode assembly in the pouch after the lead film is attached to the anode and cathode leads. For example, the electrode assembly may be first received in the internal space of the pouch as necessary, and then two electrode leads may be encompassed by a single lead film in a contact portion between an outer edge of the pouch and the anode and cathode leads.

In addition, in the present disclosure, when the electrode assembly is received in the internal space of the pouch, the lead film may be interposed between outer edges of the upper pouch and the lower pouch to be subjected to a heat fusion process performed along an outer edge of the pouch as well as a portion of the pouch in which the lead film is interposed between the pouches to thus form the sealing portion extended along the outer edge of the pouch.

On the other hand, as described above, the heat fusion process with regard to the pouch may be performed at a temperature of 160 to 220° C. When the heat fusion temperature is less than 160° C., the lead film may not obtain sealing suitable therefor to necessarily lead to the occurrence of a gap between both sides of the anode lead and the cathode lead. This gap may cause leakage of electrolyte therethrough. In addition, when the heat fusion temperature exceeds 220° C., insulation and a shape of the film may not be maintained due to melting of the lead film.

On the other hand, in the present disclosure, although a lead film type is not particularly limited, as a material of the lead film, polypropylene or polyethylene may be used to have insulation properties. When a thickness of the lead film is less than 0.05 mm, insulation properties may be deteriorated. Thus, in this case, when the battery is used, a defect such as leakage of current may cause danger. Further, when thickness of the lead film exceeds 0.15 mm, sealing of the lead film may not be realized to be suitable therefor due to occurrence of a gap and thus electrolyte may leak. Therefore, the thickness of the lead film may range from 0.05 to 0.15 mm.

In addition, the lead film according to the exemplary embodiment of the present disclosure may include one or more cut portions having a structure recessed inwardly from the exterior, between the anode lead and the cathode lead. However, the sealing portion may not be formed in a portion of an outer edge surface of the pouch overlapped with the cut portion.

In detail, in the case of the lead film including both the anode and cathode leads of the electrode assembly encompassed thereby according to the embodiment of the present disclosure, one or more cut portions having a structure recessed inwardly from the exterior, between two electrode leads, may be included. This cut portion may have a portion overlapped with an outer edge of the pouch by allowing the lead film to be interposed between outer edges of the upper pouch and the lower pouch.

However, when the sealing portion is formed, a heat fusion process may be performed except for the portion of an outer edge of the pouch overlapped with the cut portion. Therefore, the sealing portion may be continuously formed to extend along an outer edge of the pouch, but the sealing portion may not be formed in the portion overlapped with the cut portion. In this case, the portion of the sealing portion in which the cut portion is formed may have a width smaller than that of a different portion of the sealing portion except for the portion in which the cut portion is formed.

On the other hand, the cut portion formed in the lead film may be formed using a process different from the above-described process. First, an anode lead and a cathode lead may be encompassed by a single lead film, and the lead film not having formation of a cut portion may be interposed between outer edges of an upper pouch and a lower pouch. In addition, a heat fusion process may be formed along an outer edge of the pouch to form a sealing portion. Then, the cut portion may be formed by cutting, inwardly from the exterior, a portion of the lead film encompassed by the sealing portion between the anode lead the cathode lead.

In further detail, the cut portion may be formed by a process of removing both a portion of the lead film present between the anode lead and the cathode lead and a heat-fused exterior pouch material encompassing the portion of the lead film present between the anode lead and the cathode lead. However, in this case, the formed sealing portion may be extended along an outer edge of the pouch, but the portion of the sealing portion in which the cut portion is formed may have a width smaller than that of a different portion of the sealing portion except for the portion in which the cut portion is formed.

Conversely, when the secondary battery is in an abnormal operating state, an internal electrolyte may be decomposed to generate high pressure gas. According to the present disclosure, the lead film may include a cut portion as described above, and a portion of the sealing portion in which the cut portion is formed may have a width smaller than that of a different portion of the sealing portion except for the portion in which the cut portion is formed. Thus, expansion and stress may be concentrated in the portion of the sealing portion having a relatively small width in which the cut portion is formed, to induce the portion to initially open. Therefore, gas may be discharged to the exterior through the cut portion to improve battery stability and reliability in operating the manufactured battery.

In addition, in the present disclosure, the portion of the sealing portion in which the cut portion is formed may have a width smaller than that of a different portion of the sealing portion. In this case, when a difference in the widths is relatively too small, an effect of inducing gas to be discharged on a gas discharge path is relatively weak. Thus, when a high pressure gas is generated inside a battery cell, an effect of initially opening in a region in which the cut portion is formed may not be exhibited. Further, when a difference in the widths is relatively too great, battery sealing properties may not be secured. Therefore, the width of the sealing portion in which the cut portion is formed may have the size of 40 to 80%, based on the width of a different portion of the sealing portion.

In addition, the amount of the cut portions is not particularly limited, and may be appropriately adjusted in consideration of a distance between the anode and cathode leads, predicted gas pressure, and process efficiency in a formation process. For example, one or two cut portions may be formed.

In addition, the cut portion may have various shapes, for example, at least one or more selected from a group including an inverted triangular shape, a semicircular shape, a quadrangular shape, and a trapezoidal shape. In detail, the shape of the cut portion may be an inverted triangular shape to facilitate formation thereof or may be a rectangular shape to obtain an effect of effectively inducing gas discharge.

Although a secondary battery type according to an embodiment of the present disclosure is not particularly limited, a lithium ion secondary battery using a liquid electrolyte or a lithium ion polymer battery using a high molecular solid electrolyte may be used depending on an electrolyte type.

While the present disclosure has been shown and described in connection with the embodiments, it will be apparent to those skilled in the art that modifications and variations can be made without departing from the spirit and scope of the present disclosure as defined by the appended claims.

According to an exemplary embodiment of the present disclosure, by allowing an anode lead and a cathode lead of a secondary battery to be encompassed by a single lead film, sealing may be easily implemented even in a case in which a gap between leads is relatively reduced, and a secondary battery may be managed as one component by preventing the occurrence of vibrations of an electrode lead.

In addition, by forming a cut portion between an anode lead and a cathode lead of a lead film, high pressure gas inside a battery cell may be discharged to a specific location between both leads to secure operational reliability. Further, dangerous factors such as ignition or explosion of batteries may be prevented by discharging high pressure gas to thus enhance stability.

What is claimed is:

1. A secondary battery comprising:
    one or more anodes having an anode tab attached to the anode;
    one or more cathodes having a cathode tab attached to the cathode;
    an electrode assembly formed by stacking the one or more anodes and the one or more cathodes on each other to have a separation film interposed between the anode and the cathode;
    a pouch receiving the electrode assembly and having an upper portion and a lower portion;
    an anode tab bonding part electrically connected to overlapped portions of the anode tabs stacked on each other;
    a cathode tab bonding part electrically connected to overlapped portions of the cathode tabs stacked on each other;
    an anode lead connected to the anode tab bonding part;
    a cathode lead connected to the cathode tab bonding part;
    a lead film encompassing the anode lead and the cathode lead to have a form in which portions of the anode lead and the cathode lead are exposed externally; and
    a sealing portion formed by allowing an upper pouch and a lower pouch to be subjected to a heat fusion process in a state in which the lead film is interposed between outer edges of the upper pouch and the lower pouch, to then be formed on an outer edge of the pouch,
    wherein the anode lead and the cathode lead are aligned to be parallel with respect to each other and are encompassed by a single lead film,
    wherein the lead film includes one or more cut portions having a structure recessed inwardly from the exterior, between the anode lead and the cathode lead, and
    wherein exterior material of the pouch overlapped with the cut portion is removed to have the same form as that of the cut portion so as not to form the sealing portion.

2. The secondary battery of claim 1, wherein a distance between the anode lead and the cathode lead ranges from 4 to 14 mm.

3. The secondary battery of claim 1, wherein the cut portion has at least one or more selected from a group including an inverted triangular shape, a semicircular shape, a quadrangular shape, and a trapezoidal shape.

4. The secondary battery of claim 1, wherein a portion of the sealing portion in which the cut portion is formed has a width smaller than that of a different portion of the sealing portion except for the portion in which the cut portion is formed.

5. The secondary battery of claim 1, wherein a material of the lead film is polypropylene or polyethylene.

6. The secondary battery of claim 1, wherein a thickness of the lead film ranges from 0.05 to 0.15 mm.

7. The secondary battery of claim 1, wherein the secondary battery is a lithium ion secondary battery or a lithium ion polymer secondary battery.

8. A method of manufacturing a secondary battery comprising:
    preparing an electrode assembly formed by stacking one or more anodes having an anode tab attached to the anode and one or more cathodes having a cathode tab attached to the cathode in a state in which a separation film is interposed between the anode and the cathode, the electrode assembly including an anode lead connected to an anode tab bonding part electrically connected to overlapped portions of the anode tabs stacked on each other and a cathode lead connected to a cathode tab bonding part electrically connected to overlapped portions of the cathode tabs stacked on each other, the anode lead and the cathode lead being aligned to be parallel with respect to each other;
    providing the anode lead and the cathode lead to be encompassed by a single lead film to have a form in which portions of the anode lead and the cathode lead are exposed externally;
    receiving the electrode assembly in an internal space between an upper pouch and a lower pouch; and
    forming a sealing portion by performing a heat fusion process on an outer edge of the pouch in a state in which the lead film is interposed between outer edges of the upper pouch and the lower pouch, and
    wherein the lead film includes one or more cut portions having a structure recessed inwardly from the exterior, between the anode lead and the cathode lead, and
    wherein exterior material of the pouch overlapped with the cut portion is removed to have the same form as that of the cut portion so as not to form the sealing portion.

9. The method of claim 8, wherein the cut portion has at least one or more selected from a group including an inverted triangular shape, a semicircular shape, a quadrangular shape, and a trapezoidal shape.

10. The method of claim 8, wherein the lead film interposed between the outer edges of the upper pouch and the lower pouch includes one or more cut portions.

11. The method of claim 10, wherein in the forming of the sealing portion, a heat fusion process is performed except for a portion of an outer edge of the pouch overlapped with the cut portion.

12. The method of claim 8, wherein the cut portion is formed by cutting, inwardly from the exterior, a portion of the lead film encompassed by the sealing portion, subsequently to the forming of the sealing portion.

13. The method of claim 11, wherein a portion of the sealing portion in which the cut portion is formed has a width smaller than that of a different portion of the sealing portion except for the portion in which the cut portion is formed.

14. The method of claim 12, wherein a portion of the sealing portion in which the cut portion is formed has a width smaller than that of a different portion of the sealing portion except for the portion in which the cut portion is formed.

* * * * *